(12) United States Patent
Katsu et al.

(10) Patent No.: US 7,064,741 B2
(45) Date of Patent: Jun. 20, 2006

(54) LIGHT SOURCE DEVICE, DISPLAY DEVICE AND REFLECTION SHEETS FOR USE THEREWITH

(75) Inventors: Yoshihiro Katsu, Sagamihara (JP);
Akiko Nishikai, Yokohama (JP);
Michikazu Noguchi, Sagamihara (JP);
Masaru Suzuki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/121,463

(22) Filed: Apr. 11, 2002

(65) Prior Publication Data

US 2002/0154087 A1 Oct. 24, 2002

(30) Foreign Application Priority Data

Apr. 18, 2001 (JP) ............... 2001-119574

(51) Int. Cl.
*G09G 3/36* (2006.01)
(52) U.S. Cl. ............ 345/102; 345/104; 359/379; 349/67
(58) Field of Classification Search ............ 345/102, 345/103, 104, 1.2, 98, 32, 46; 349/61, 62, 349/67, 63, 113, 118, 65, 162; 362/554, 362/558, 559; 359/859, 861, 869, 341.5, 359/359, 360, 361, 266, 364, 379; 428/694 SC, 428/694 RL; 313/505, 506, 511
See application file for complete search history.

(56) References Cited

U.S. PATENT DOCUMENTS

| | | | | | |
|---|---|---|---|---|---|
| 4,956,215 | A | * | 9/1990 | Fujita et al. | ............... 428/64.6 |
| 5,151,345 | A | * | 9/1992 | Hasebe | ............... 430/525 |
| 5,854,780 | A | * | 12/1998 | Opheij et al. | ............ 369/44.23 |
| 6,074,067 | A | * | 6/2000 | Shimada | ............... 359/850 |
| 6,191,833 | B1 | * | 2/2001 | Hirakata | ............... 349/61 |
| 6,591,037 | B1 | * | 7/2003 | Yonekubo | ............... 385/32 |

FOREIGN PATENT DOCUMENTS

| | | |
|---|---|---|
| JP | 9090107 | 4/1997 |
| JP | 11064613 | 3/1999 |

\* cited by examiner

*Primary Examiner*—Amr A. Awad
*Assistant Examiner*—Abbas Abdulselam
(74) *Attorney, Agent, or Firm*—Arthur J. Samodovitz; Lawrence R. Fraley (57) ABSTRACT

A light source device and display device capable of suppressing occurrence of unevenness in luminance therefrom by using a light guide with concave or convex structural portions in combination with a reflection layer disposed adjacent the light guide and including a plurality of spacers for strategically positioning the layer's reflecting surface from the light guide. Light within the light guide is both reflected from the guide (e.g., to an adjacent display panel) or emitted onto the reflecting surface and passed back through the guide for eventual emission (e.g., to the same display panel). A reflection sheet including a base sheet, reflection layer and structural portions is also provided.

17 Claims, 5 Drawing Sheets

LIGHT SOURCE DEVICE, DISPLAY DEVICE AND REFLECTION SHEETS FOR USE THEREWITH

BACKGROUND OF THE INVENTION

The present invention relates to a planar light source device, a display device and an optical reflection sheet.

As an image display device for a personal computer or other various monitors, use of liquid crystal display devices has been widespread. In general, a liquid crystal display device has a liquid crystal display panel and a backlight unit disposed on a back thereof. The liquid crystal display panel displays an image by controlling light transmitted therethrough. Among some types of liquid crystal display devices, there is one having a sidelight type backlight unit. The sidelight type backlight unit typically includes a cold cathode fluorescent tube as a light source disposed on a side of a display surface of the device.

Figure 1:
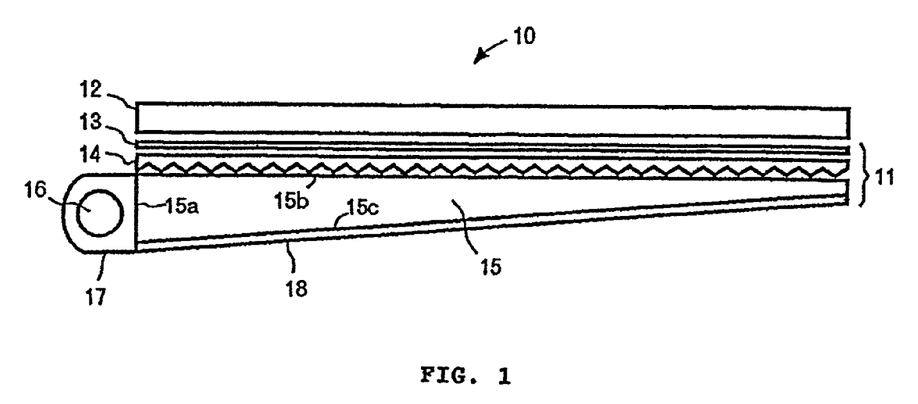
FIG. 1 is a side-elevational view showing a known liquid crystal display device.

FIG. 1 is a side elevational view showing a liquid crystal display 10 having a sidelight type backlight unit. In this drawing, reference numeral 11 denotes a backlight unit. Numeral 12 denotes a liquid crystal display panel to which a drive circuit is fitted. Numeral 13 denotes a diffusion sheet for diffusing light to even brightness on a surface of the liquid crystal display panel. Numeral 14 denotes a prism sheet for collecting light to improve luminance on the front of the display panel. Numeral 15 denotes a light guide plate for guiding and diffusing light from the display's light source. Numeral 16 denotes a cold cathode fluorescent tube which serves as a linear light source. Numeral 17 denotes a lamp reflector for reflecting light from the cold cathode fluorescent tube, and numeral 18 denotes a reflection sheet reflecting light, which is disposed on a back of the light guide plate.

On back lower surface 15c of the light guide plate is formed a dot pattern made of white ink or consisting of concave or convex structural portions. Light from cold cathode tube 16 passes through a light incident surface 15a into the light guide plate 15 and propagates therein. Since the refractive index of the light guide plate is greater than that of air, light would not be emitted from the upper surface 15b of the light guide plate without the patterned back (lower) surface 15c. Such a pattern on back surface 15c changes the angle of light propagation in the light guide plate and causes the light to be emitted from light emitting surface 15b.

Light incident on back surface 15c is reflected (in a scattered manner) by the provided pattern. Thus, the angle of the light is changed, and constant light is emitted from upper surface 15b. Light having the angle thereof changed is partially made incident again onto surface 15c, transmitted through the surface 15c, reflected by reflection sheet 18, and made incident again into light guide plate 15. Light made incident onto concave or convex structural portions is partially reflected thereon, the other part being transmitted therethrough and also reflected by reflection sheet 18. Thus, since the angle of this light is also changed, it too is emitted from upper surface 15b.

The dot pattern or the pattern of concave/convex structural portions is formed so that the density thereof can be varied, depending on the locations thereof. Thus, the luminance of light emitted from upper surface 15b is substantially even.

In a conventional sidelight type backlight unit, a white reflection sheet has been used. While a white reflection sheet has relatively high reflectivity, it also has many diffusion reflection components. Specular reflectance of a typical white reflection sheet is several percent. Meanwhile, a reflection sheet of metal (e.g., having a silver reflectance layer) has much higher reflectivity than such a white reflection sheet. Particularly, such a metal reflection sheet has more specular reflection components than a white reflection sheet. In a liquid crystal display, proper luminance is obviously a significant technical aspect, particularly in a liquid crystal display for use in a notebook type PC or the like. In order to achieve luminance improvement of liquid crystal displays, particularly, improvement of the front luminance thereof, a reflection sheet having many specular reflection components, and is comprised of metal, has been attempted. However, the inventors of the present invention have discovered that a problem of unevenness in luminance occurs when a silver-layered reflection sheet is used for the sidelight type backlight unit. For example, if the reflection sheet is pushed by finger from the back thereof, light emitted from the backlight unit will have uneven brightness levels. In such backlight units, the back of the frame accommodating the reflection sheet, and the light guide plate typically has large openings. These openings are made for the purpose of reducing weight of the backlight unit and thus the overall display. The back of the frame has a plurality of large openings and a plurality of beams defining the openings. Hence, when the backlight unit is mounted onto the liquid crystal display, portions of the backlight unit, which are exposed from the openings, are pressed by other parts of the liquid crystal display, or the reflection sheet is pressed by the beams. Moreover, even if the back of the frame does not have the openings, the unevenness in luminance is sometimes recognized because the reflection sheet may be warped.

In a backlight unit in which a pattern of concave/convex structural portions are formed on the guide plate and a silver reflection sheet is combined with such structural portions on the back of the light guide plate, unevenness in brightness from the emitting surface of the light guide plate resulted. In contrast, in the case of a light guide plate having a white ink dot pattern, unevenness in brightness was not visually recognized. This is believed to be because the concave/convex structural portions have a much smaller diffusion capability than the white ink dot pattern. Moreover, the problem of uneven luminance owing to the aforementioned press by a finger was more serious, especially when using a downward-facing prism sheet (as opposed to an upward-facing prism sheet). This is believed to occur because, while the upward-facing prism sheet has a function of reflecting light incident thereon to return the same to the light guide plate, the downward-facing prism sheet is used to emit light once incident thereon directly to the display panel. As a result, it was discovered that the occurrence of uneven luminance depends on the distance between the reflection sheet and the light guide plate. A transparent polyethylene terephthalate sheet was interposed between the silver reflection layer and the light guide plate, and luminance was measured while varying a thickness of the transparent sheet. It was learned that it was possible to reduce the unevenness in luminance by thickening the transparent sheet. However, it was also discovered that two problems were caused by interposing such a transparent sheet in such a manner. One was a lowering of luminance due to absorption of light by the transparent sheet. For example, in the case of interposing a sheet having a thickness of 75 micrometers, a lowering of luminance by about 6% occurred. Another is a problem of a "bright line". The light guide plate and the reflection sheet are sandwiched by a reflector of the cold cathode tube. When a thick transparent sheet is interposed in this region, light is made incident from a side of the transparent sheet, resulting in the incident light becoming a "bright line" and appearing on the surface of the backlight unit.

Japanese Patent Laid-Open No. Hei 9(1997)-90107 discloses a technique in which glass beads are coated on the surface of the reflection sheet in the sidelight type backlight unit. Further, Japanese Patent Laid-Open No. Hei 11(1999)-64613 discloses a reflection body having an uneven layer consisting of a particle layer and a metal reflection layer formed thereon in a direct type backlight unit. However, neither of these embodiments appear to consider unevenness in luminance which occurs when using a metal reflection sheet. In the above-described documents, the glass beads and the uneven layer are formed for the purpose of diffusion and reflection of light. Accordingly, front luminance is reduced.

OBJECTS AND SUMMARY OF THE INVENTION

It is a primary object of the present invention to enhance the display device art.

It is another object of the present invention to provide a backlight unit display device capable of increasing the front luminance thereof while reducing unevenness in luminance compared to a conventional backlight unit device using a white reflection sheet.

It is still another object of the present invention to provide a display device of the type defined herein which can be produced relatively expeditiously and thus at relatively low cost to the purchaser thereof.

According to one aspect of the present invention, there is provided a light source device comprising a light source for emitting light, a light guide including a light incident surface for receiving the emitted light from the light source, the light incident surface being substantially adjacent the light source, a light emitting surface for emitting the light incident from the light source, and a back having a plurality of structural portions for reflecting thereon and transmitting therethrough the incident light, the back being substantially opposite to the light emitting surface, a reflection layer having a reflection surface for reflecting the light emitted from the back of the light guide, the reflection layer being disposed adjacent the back of the light guide, and a plurality of spacers positioned substantially between the reflection surface of the reflection layer and the back of the light guide so as to maintain a predetermined spacing therebetween.

Preferably, an area ratio of the plurality of spacers to the reflection surface ranges from about 0.1% to about 20%, more preferably from about 0.1% to about 10%. Further, a height of the columnar structural portions (spacers) may be 15 micrometers or higher.

It is possible, according to one aspect of the invention, to use spacers as columnar structural portions, formed of a transparent material, on the reflection surface. According to another aspect, it is possible to provide spacers including inner columnar structural portions formed under the reflection layer and outer layers formed of the same material as that of the reflection layer outside the columnar structural portions.

Preferably, the light source device may comprise a prism sheet having a plurality of prism structural portions formed on one surface thereof, the prism structural portions designed for regulating the emitted angles of light transmitted through the prism sheet. Preferably, the prism sheet is disposed on an upper surface of the light guide in order for the prism structural portions to face the light guide.

According to another aspect of the invention, there is provided a display device which comprises a backlight unit and a display panel including a plurality of pixels arranged in a matrix, the display panel displaying an image by controlling transmission of light from the backlight unit through the plurality of pixels, wherein the backlight unit includes a light source, a light guide having a light incident surface for receiving light from the light source, the light incident surface being opposite to the light source, a light emitting surface for emitting the light incident from the light source, and a back having any of a plurality of concave structural portions and a plurality of convex structural portions for reflecting thereon and transmitting therethrough the incident light, the back being opposite to the light emitting surface, a metal reflection layer for reflecting the light emitted from the back of the light guide, the metal reflection layer being disposed on the back of the light guide, and a plurality of columnar structural portions arranged discretely between a reflection surface of the metal reflection layer and the back of the light guide so as to maintain a specified interval therebetween.

According to yet another aspect of the present invention, there is provided an optical reflection sheet comprising a base sheet, a reflection layer formed on the base sheet, and a plurality of columnar structural portions positioned on the base sheet and extending above the reflection layer, the structural portions having an area ratio to the reflection layer ranging from about 0.1% to about 20% and having a height of 15 micrometers or higher.

Finally, according to still a further aspect of the invention, there is provided an optical reflection sheet comprising a base sheet, a reflection layer formed on the base sheet, and a plurality of structural portions positioned on the base sheet and covered by the reflection layer, the structural portions having an area ratio to the reflection layer ranging from about 0.1% to about 20% and having a height of 15 micrometers or higher.

It is believed that a light source device, display device and optical reflection sheet possessing the distinct advantages defined herein over known such structures would constitute significant advancements in the art.

BRIEF DESCRIPTION OF THE DRAWINGS

For a more complete understanding of the present invention and the advantages thereof, reference is now made to the following description taken in conjunction with the accompanying drawings, in which.

BEST MODE FOR CARRYING OUT THE INVENTION

In a backlight unit according to one embodiment of this invention, a plurality of spacers are arranged between a light guide plate and a reflection sheet located on a back thereof. Even if the reflection sheet is pressed, a constant clearance is maintained between the back of the light guide plate and the reflection sheet by these spacers. It is thus possible to reduce unevenness in luminance on the surface of the backlight unit. Hereinafter, description will be made of a liquid crystal display device. The respective drawings are for illustrating this particular device, but it is understood that the invention is not limited to those of the liquid crystal type.

Figure 2:
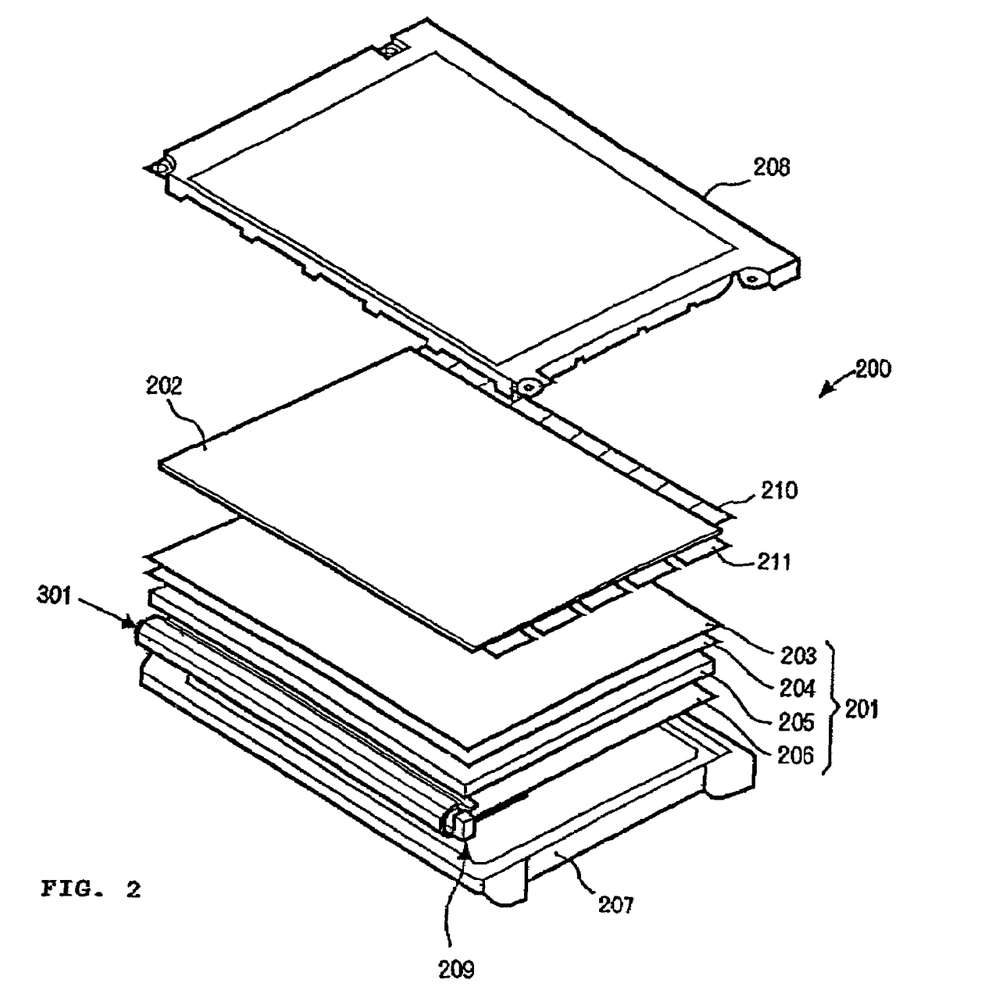
FIG. 2 is an exploded isometric view showing a liquid crystal display device according to one embodiment of the present invention.

FIG. 2 is an exploded isometric view illustrating a liquid crystal display device according to one embodiment of the invention. FIG. 2 schematically shows the device 200 having a sidelight type backlight unit. In this drawing, reference numeral 201 denotes the backlight unit, and numeral 202 denotes a liquid crystal display panel to which a drive circuit (e.g., source driver ICs 210 and gate driver ICs 211—see more below) is fitted. Numeral 203 denotes a diffusion sheet for diffusing light to provide even brightness on the surface of liquid crystal display panel 202, and numeral 204 denotes a prism sheet for collecting light to improve the luminance at the front of the display. Numeral 205 denotes a light guide plate for guiding and diffusing light from a light source (more below), while numeral 206 denotes a reflection sheet reflecting the incident light.

Numeral 207 denotes a frame for accommodating the various parts of the backlight unit 201, such as the light guide plate and prism sheet. Prism sheet 204 and/or diffusion sheet 203 are preferably formed as an uneven structure comprised of organic resin on a base film made of a material such as polyethylene terephthalate, having a combined thickness of several hundred micrometers. Frame 207 is preferably formed of an organic resin material such as polycarbonate. The bottom of frame 207 has four large openings (not shown) defined by two beams (not shown) formed in a cross shape on the bottom of the frame. Weight reduction of backlight unit 201 is attained by providing openings in such a manner.

Liquid crystal display panel 202 has a display area comprised of a plurality of pixels arranged in a matrix, surrounded by a picture frame area. Liquid crystal display panel 202 also has an array substrate having an array circuit formed thereon, a second substrate opposite thereto, and liquid crystal material sealed therebetween. Such elements are known and further description is not necessary. Reference numeral 209 denotes a cold cathode fluorescent tube which serves as a linear light source and numeral 208 denotes a metal bezel holding and protecting liquid crystal display panel 202 and the backlight unit 201. Backlight unit 201, as understood, is composed of diffusion sheet 203, prism sheet 204, light guide plate 205, reflection sheet 206, frame 207 and cold cathode tube 209. Cold cathode tube 209 is disposed within a cylindrical lamp reflector 301.

Each pixel in the display area of liquid crystal display panel 202 displays any one color of red, green and blue. A plurality of signal lines and gate lines are arranged in a matrix in the display area on the array substrate. The signal lines and gate lines are arranged so as to overlap approximately perpendicularly to each other. Each pixel applies an electric field to the liquid crystal based on a display signal voltage inputted from a driver IC 210 or 211 (see below). Typically, the driver IC is connected to the array substrate through a tab connection (shown), but in some cases, it is directly provided on a glass substrate of the array substrate.

Typically, a plurality of source driver ICs 210 for the signal lines are provided along an X-axis edge of the TFT array substrate, and a plurality of gate driver ICs 211 for the gate lines controlling gate voltages are provided along a Y-axis edge. A voltage inputted from each source driver IC 210 is sent to a pixel electrode through source/drain of a TFT, then the pixel electrode and a common electrode apply a voltage to the liquid crystal. Such an applied voltage to the liquid crystal can be changed by changing the voltage from source driver IC 210, thus light transmittance of the liquid crystal is controlled. A circuit applying a common potential to the common electrode is constituted on a control circuit board (not shown). The present invention can be applied to a variety of liquid crystal display panels, several of which are known, e.g., simple matrix type, active matrix type, etc.

Figure 3:
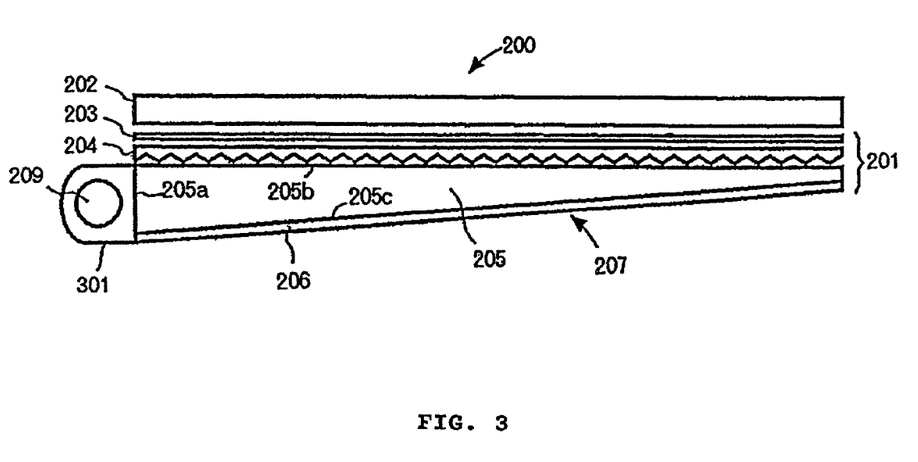
FIG. 3 is a side-elevational view of the liquid crystal display device of FIG. 2.

FIG. 3 is a sectional view schematically showing a construction of a sidelight type backlight unit according to one embodiment of this invention. (It is acknowledged that the external view of the invention as depicted in FIG. 3 is similar to the display device in FIG. 1. As understood, the primary attributes of this invention are found after careful review of the interior aspects thereof.) The same reference numerals are used to identify similar components as shown in FIG. 2. In FIG. 3, reference numeral 301 denotes a lamp reflector surrounding a cold cathode tube 209 for reflecting light therefrom. Lamp reflector 301 is made of brass, and on an inner surface thereof, a white or Ag reflection layer is formed. It is also possible to form the lamp reflector of white resin. Reference numeral 205a denotes a light incident surface opposite to cold cathode tube 209 for receiving light from cold cathode tube 209, numeral 205b denotes an upper, light-emitting surface of the light guide plate, which emits light toward liquid crystal display panel 202, and numeral 205c denotes a back of the light guide plate, which is opposite to light emitting surface 205b. On back 205c of the light guide plate is formed a pattern of a large number of concave structural portions or convex structural portions. The concave/convex structural portions can have a hemispherical shape, a pyramidal shape, a conical shape and the like.

Prism sheet 204 is a so-called downward-facing prism sheet. On one surface of this prism sheet are formed a plurality of prism structural portions having a light collection action. A prism sheet having prism structural portions facing the light guide plate is called the downward-facing prism sheet. A cross-section of the plurality of prism structural portions indicates a sawtooth shape, and ridgelines thereof extend from one side of the sheet to the other side. On light emitting surface 205b of light guide plate 205 are formed a plurality of prism structural portions, each having a triangular shape in cross section, the prism structural portions extending from the light incident surface to a surface opposite thereto. A height of the triangular cross section of each prism structural portion is typically about 10 to several 10's of micrometers. Prism sheet 204 is disposed so that the ridgelines of the prism structural portions on the light guide plate can be perpendicular to the ridgelines of the prism structural portions of prism sheet 204. Note that another structure is enabled, in which the above-described prism structural portions mainly having a function of regulating an angle of the emitted light are formed as the concave/convex structural portions on back 205c of the light guide plate, and concave/convex structural portions mainly having a function of assuring the light passing from the emitting surface is evenly emitted from surface 205b.

Note that, as such a prism sheet, it is also possible to use an upward-facing prism sheet disposed so that the prism structural portions face upward. However, since the upward-facing prism sheet is used in a pair, the luminance is lowered in comparison with the downward-facing prism sheet functioning as one sheet.

Moreover, the prism structural portions do not necessarily have to be formed on light emitting surface 205b of the light guide plate. It is also possible to add another prism sheet instead of the prism structural portions on the light guide plate. As a matter of course, it is also possible to omit the diffusion sheet, alternatively to roughen one surface of the prism sheet and integrate the prism sheet and the diffusion sheet. For the prism structural portions, it is also possible to adopt a conical shape or polygonal shape besides the above.

However, in order to improve the luminance of the entire display and the front luminance, a structure is preferable, in which the light guide plate 205 having the prism structural portions and one sheet of the downward-facing prism sheet 204 are used.

Figures 4A, 4B:
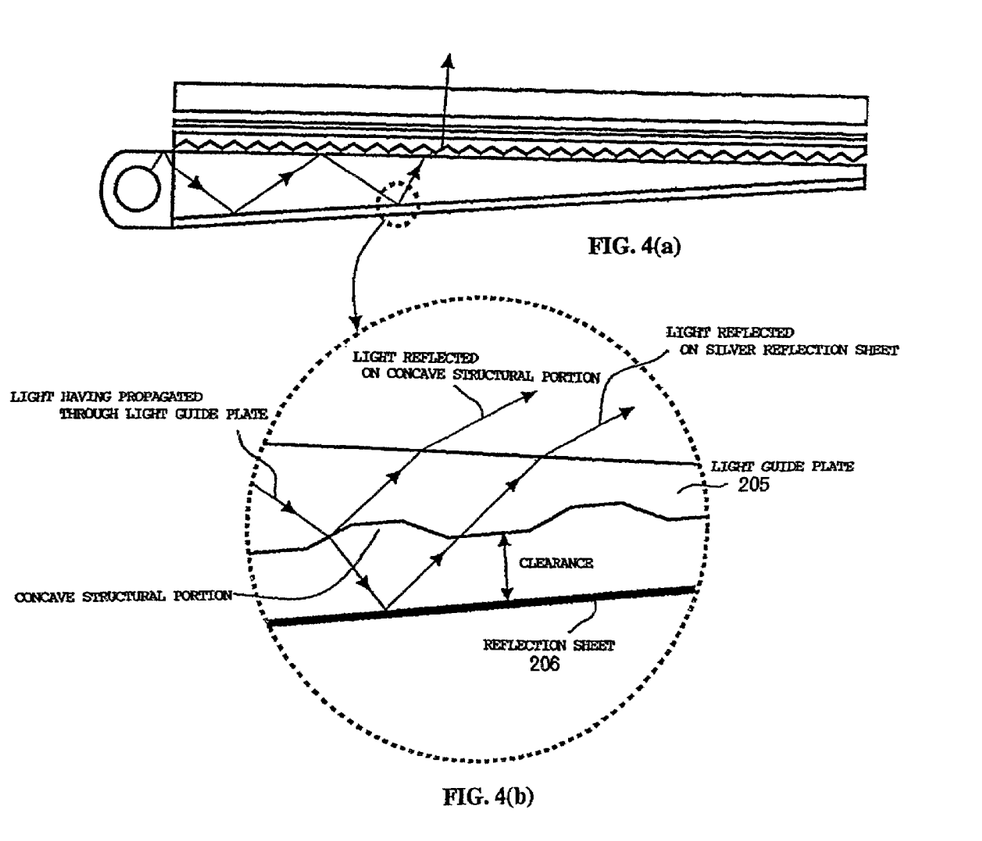
FIGS. 4(a) and 4(b) are cross-sectional views illustrating light propagation in a backlight unit according to one embodiment of the invention.

As shown in FIGS. 4(a) and 4(b), and comparing FIG. 3, light from cold cathode tube 209 enters the light guide plate from light incident surface 205a, travels through the inside of the light guide plate with repeated reflection, and is eventually emitted from upper surface 205b to liquid crystal display panel 202. The incident angles of light in light guide plate 205 relative to light emitting surface 205b are changed by a large number of concave/convex structural portions formed on the surface of back 205c of the light guide plate, and thus the light in light guide plate 205 is emitted from light emitting surface 205b. The light incident onto slant surfaces of the concave/convex structural portions is partially reflected thereon, and the other part thereof is transmitted therethrough. Reflection sheet 206 is disposed on the back of light guide plate 205. Light emitted from back 205c of light guide plate 205 is reflected on reflection sheet 206 and again incident onto light guide plate 205.

The light reflected on the concave/convex structural portions and the light reflected on reflection sheet 206 are incident onto light emitting surface 205b of the light guide plate. Since an incident angle of the light incident onto light emitting surface 205b is smaller than the critical angle, the incident light is emitted from light emitting surface 205b. The light from light emitting surface 205b is collected toward the front direction of the display surface by prism sheet 204. The light reflected in the downward-facing prism sheet is emitted to the display panel 202. Diffusion sheet 203 contributes to evenness of the luminance on the display surface by diffusing light from the prism sheet 204. Diffusion sheet 203 is disposed between light guide plate 205 and prism sheet 204, as shown.

Figure 5A:
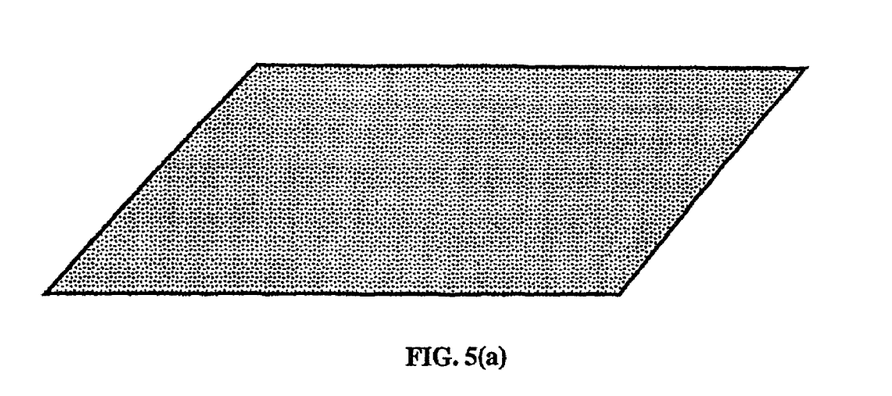
FIGS. 5(a) to 5(c) illustrate the structure of a reflection sheet according to one embodiment of the invention.

In this embodiment, an Ag reflection sheet is preferably used as reflection sheet 206. However, the reflection sheet can be formed of other metal such as Al. Alternatively, other than the metal reflection layer formed of Ag or Al, a reflection layer using a liquid crystal material or the like can also be used. FIG. 5a is a perspective view showing a structure of the reflection sheet in this embodiment. On the reflection sheet, a large number of columnar structural portions are formed.

Figure 5B:
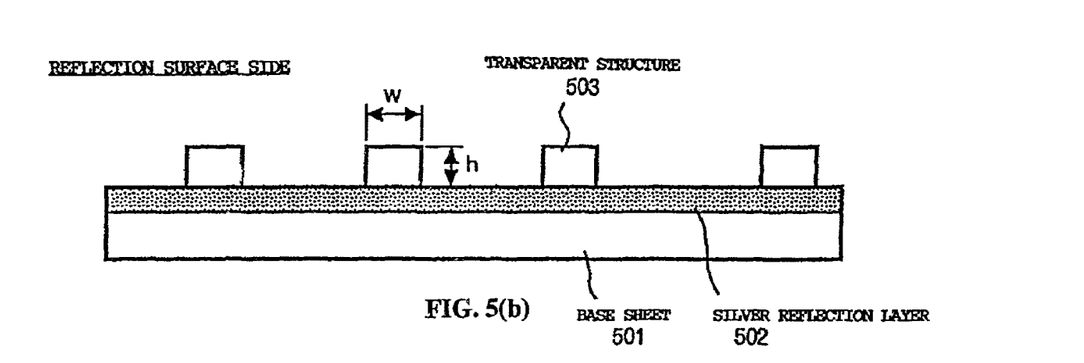

FIG. 5(b) is a cross-sectional view showing one embodiment of a structure of reflection sheet 206. Reflection sheet 206 has a base sheet 501 formed of a resin material such as polyethylene terephthalate and an Ag reflection layer 502 formed on base sheet 501. The surface of the Ag reflection layer is comprised of specular reflection components and is thus a mirror reflection surface. By a mirror reflection surface is meant a surface in which the specular reflection components occupy 70% of the surface or more; that is, a surface having specular reflectivity of 70% or more. In order to enhance front luminance, more specular reflection components are preferable. Specifically, the surface of the Ag reflection layer preferably has specular reflectivity of 80% or more, more preferably 90% or more. The specular reflectivity of a typical Ag layer is 95% or more. Here, the specular reflection means the case where an incident angle and a reflection angle are equal to each other. The Ag layer can be deposited by a technique such as vacuum deposition and sputtering.

An extremely thin protective layer (not shown) is deposited on the Ag layer. This protective layer prevents oxidation of the Ag. On the Ag layer, a plurality of columnar structural portions are discretely formed. The columnar structural portions in FIG. 5(b) have a cylindrical or rectangular (square) pillar shape. The height and width of each of the columnar structural portions are approximately identical. The columnar structural portions function as spacers maintaining an interval between the reflection surface of sheet 206 and back 205c of light guide plate 205. Columnar structural portions 503 are formed of a transparent material such as acrylic. It is also possible to form columnar structural portions 503 using a printing technique. Since the reflection sheet has columnar structural portions as spacers, the luminance can be reduced by interposing a transparent sheet between the reflection layer and the light guide plate.

Figure 5C:
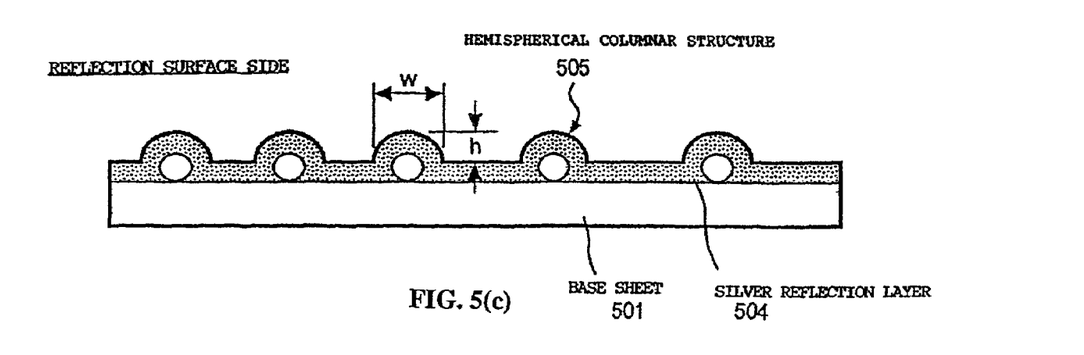

FIG. 5(c) is a cross-sectional view showing a reflection sheet according to another embodiment of the invention. In this drawing, reference numeral 501 denotes a base sheet formed of a resin material such as polyethylene terephthalate. On base sheet 501, spherical particles are arranged and fixed by an adhesive material such as epoxy resin. The spherical particles can be formed of an organic resin material such as acrylic or an inorganic material such as silica. The particles can be arranged on base sheet 501 by dispersing a mixed material with the adhesive material and the spherical particles (beads) on base sheet 501. On the particles, an Ag reflection layer is formed. Similarly to FIG. 4(b), a protective layer (not shown) is preferably formed on the Ag reflection layer.

Columnar structural portions 505 thus have inner cores comprised of spherical particles as inner columnar structural portions with the Ag reflection layer serving as an outer layer formed on the outside of these inner cores. Columnar structural portions 505 are similar to transparent columnar structural portions 503 formed on the Ag reflection layer in FIG. 5(b) to the point of serving as spacers for maintaining the interval between the reflection surface of the Ag reflection layer and the back of the light guide plate. Forming the columnar structural portions by arranging the particles under the Ag reflection layer can increase the luminance more than forming transparent columnar structural portions as shown in FIG. 5(b). This is because, though by a small amount, the transparent columnar structural portions absorb light.

The height of the columnar structural portions is based on unevenness of luminance on the surface of the backlight unit. The height is preferably about 15 micrometers or higher, more preferably 20 micrometers or higher, far more preferably 25 micrometers or higher. When the height (the interval between the reflection surface and the back of the light guide plate) is set at 25 micrometers or higher, unevenness in luminance caused by the aforementioned pressing force, e.g., by an operator's finger, is barely noticeable. In order to maintain the interval between the reflection surface and the back of the light guide plate against such a pressing force from the outside, it is preferable to have as many columnar structural portions as possible. However, if too many columnar structural portions are arranged, diffuse reflection components on the columnar structural portions are increased, thus lowering the front luminance of the backlight unit. An area ratio of the columnar structural portions to the reflection surface must be determined based on a balance between the function as spacers and the reduction of the specular reflection components (meaning the increase of the diffuse reflection components). The area ratio of the columnar structural portions to the reflection surface is preferably set in a range from about 0.1% to about 20%. When the ratio exceeds this range, the specular reflection components of the reflection sheet are reduced, and the advantages obtained using the Ag reflection are also reduced. The area ratio of the columnar structural portions to the reflection surface is set more preferably in a range from 0.1% or more to 10% or less, far more preferably in a range from 0.1% or more to 5% or less. Here, this area ratio is a ratio of the sum of the maximum sectional area of the columnar structural portions to the entire reflection surface.

Figure 6:
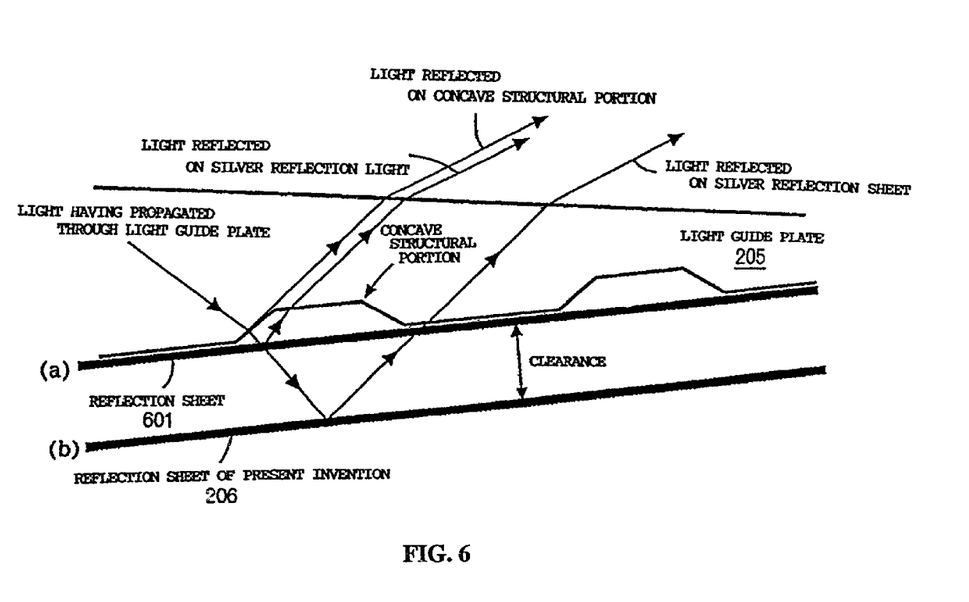
FIG. 6 is a much enlarged, partial sectional view illustrating reflection/transmission actions of light of a light guide plate and reflection sheet according to one embodiment of the invention.

FIG. 6 (comparing again to FIG. 3) is a cross-sectional view showing the construction of back 205c of the light guide plate and reflection sheet 206. Back 205c of the light guide plate has a large number of concave structural portions. A width of each concave structural portion typically ranges from several tens of micrometers to several hundreds of micrometers. A depth thereof is typically only about 10 micrometers. Filling rates of the concave structural portions are varied depending on locations thereof on the back of the light guide plate. Thus, even luminance of light from the light guide plate is achieved. Typically, the maximum filling rate of the concave structural portions is about 90%, and the minimum filling rate thereof is about 10%.

The light incident from light incident surface 205c into light guide plate 205 propagates in light guide plate 205 with repeated reflection. During the propagation, the light is partially made incident onto the concave structural portions formed on back 205c. The light incident onto the concave structural portions is partially reflected on the slant surfaces thereof, as shown. Moreover, since the incident angle of the light incident onto the slant surfaces of the concave structural portions is smaller than the critical angle, other incident light is transmitted therethrough and reaches reflection sheet 206. The light incident onto reflection sheet 206 is regularly reflected thereon and returns to back 205c. Since the large number of columnar structural portions are formed on reflection sheet 206, even if a pressing force is applied from the outside onto reflection sheet 206, a constant clearance is maintained between back 205c of light guide plate and reflection sheet 206. As mentioned, the occurrence of uneven luminance is suppressed by maintaining the clearance as also described above. One believed reason for this is that the light transmitted through the concave structural portions has a degree of diffusibility due to the roughness of the concave structural portions. Hence, if the clearance is large, the diffusibility of the light reflected on the reflection sheet is increased, which is believed to contribute to the reduction of the unevenness in luminance on the display surface.

Moreover, the light components incident onto each slant surface of the concave structural portions are partially reflected thereon and emitted from the light emitting surface. Meanwhile, the light transmitted through each concave structural portion is reflected on the reflection sheet, passes through the light guide plate, and is emitted from the light emitting surface. As understood from FIG. 6, the larger the clearance between the light guide plate and the reflection sheet, the longer the distance between these two light components on the light emitting surface becomes. As shown by reference numeral 601 (indicating sheet 206 extremely close to guide plate 205 back 205c), if the clearance is small, the distance between the two light components becomes extremely short. If the reflection sheet is pressed by finger or the like, the distance between the light guide plate and the reflection sheet becomes so short, and the two light components are extremely close to one another, almost overlapping. Then, a difference in luminance is caused between a portion where the two light components are separate and a portion where the components almost overlap, thus causing unevenness in luminance. However, with reflection sheet 206 spaced at the desired greater clearance spacing ((b) in FIG. 6), especially where the constant clearance is maintained by spacers, the two light components are always emitted separately from each other by a constant distance or more. Therefore, an unacceptable difference in luminance does not result.

Although the preferred embodiments of the present invention have been described in detail, it should be understood that various changes, substitutions and alternations can be made therein without departing from spirit and scope of the inventions as defined by the appended claims. For example, it is also possible to form the columnar structural portions of only Ag without using a material other than Ag. Moreover, not being limited to the above-mentioned shape, it is possible to adopt a semispherical shape, a square-pillar shape, and others. In FIG. 6, the pattern shown includes a large number of concave structural portions formed on the back of the light guide plate. However, convex structural portions can carry out a similar function to that of these concave structural portions. Further, in the above embodiments, the columnar structural portions are defined as being formed on the reflection sheet; however, it is also possible to form these columnar structural portions on the back of the light guide plate. The reflection layer not only is formed as a reflection sheet, but also can be formed by directly laminating the Ag reflection layer on the bottom of the frame.

What is claimed is:

1. A light distribution device for an LCD, comprising:
a light source for emitting light;
a light guide including a light incident surface for receiving said emitted light from said light source, said light incident surface being substantially adjacent to said light source, a first light reflection surface for reflecting a first portion of said emitted light toward said LCD, and a plurality of three-dimensional structures on said first reflection surface for reflecting a second portion of said emitted light toward said LCD;
a planar reflection layer having a second light reflection surface underlying and spaced from said first reflection surface, a third portion of said emitted light passing through said first reflection surface and/or said three-dimensional structures to said second reflection surface, said second reflection surface being oriented to reflect said third portion of said light toward said LCD through said first reflection surface; and
a plurality of spacers across a face of said second reflection surface between said first and second reflection surfaces to maintain a predetermined spacing therebetween.

2. The light distribution device according to claim 1, wherein each of said plurality of three-dimensional structures has a substantially concave or substantially convex surface.

3. The light distribution device according to claim 1 wherein an area ratio of said plurality of spacers to said second reflection surface ranges from about 0.1% to about 20%.

4. The light distribution device according to claim 1 wherein said spacers are columnar structural components formed of a transparent material on said second reflection surface.

5. The light distribution device according to claim 1, further including a base layer supporting said second reflection surface, said spacers comprising columnar structural portions formed on said base layer under said reflection Layer.

6. The light distribution device according to claim 1, further including a prism sheet having a plurality of prism structural portions formed on one surface thereof, said prism sheet positioned between said light guide and said LCD.

7. The light distribution device according to claim 1, wherein a height of each of said spacers is 15 micrometers or higher.

8. The light distribution device according to claim 1 further comprising a plurality of spacers across a face of said second reflection surface between said first and second reflection surfaces to maintain a predetermined spacing therebetween.

9. The light distribution device according to claim 1 wherein said planar reflection layer and said second reflection surface are substantially parallel to each other and to said first reflection surface.

10. A display device, comprising:
a display panel including a plurality of pixels arranged in a matrix, said display panel displaying an image by controlling transmission of light through said plurality of pixels,
a light source for emitting light;
a light guide including a light incident surface for receiving said emitted light, said light incident surface being substantially adjacent to said light source, a first light reflection surface for reflecting a first portion of said emitted light toward said display panel, and a plurality of three-dimensional structures on said first reflection surface for reflecting a second portion of said emitted light toward said display panel;
a planar reflection layer having a second light reflection surface underlying and spaced from said first reflection surface, a third portion of said emitted light passing through said first reflection surface and/or said three-dimensional structures to said second reflection surface, said second reflection surface being oriented to reflect said third portion of said light toward said display panel through said first reflection surface; and
a plurality of spacers across a face of said second reflection surface between said first and second reflection surfaces to maintain a spacing there between.

11. The display device according to claim 10, wherein an area ratio of said plurality of spacers to said second reflection surface ranges from about 0.1% to about 10%.

12. The display device according to claim 10, wherein said spacers are columnar structural portions formed of a transparent material on said second reflection surface.

13. The display device according to claim 10, further including a base layer supporting said second reflection surface, said spacers comprising columnar structural portions formed on said base layer under said reflection layer.

14. The display device according to claim 10, further including a prism sheet having a plurality of prism structural portions formed on one surface thereof, said prism sheet positioned between said light guide and said display panel.

15. The display device according to claim 10, wherein a height of each of said spacers is 15 micrometers or higher.

16. The display device according to claim 10 wherein said planar reflection layer and said second reflection surface are substantially parallel to each other and to said first reflection surface.

17. The display device according to claim 10 wherein said planar reflection layer and said second reflection surface are substantially parallel to each other and to said first reflection surface.

* * * * *